US008984529B2

(12) United States Patent
Gibson

(10) Patent No.: US 8,984,529 B2
(45) Date of Patent: Mar. 17, 2015

(54) COMPUTING DEVICE HAVING A MULTIPLE PROCESS ARCHITECTURE FOR RUNNING PLUG-IN CODE MODULES

(75) Inventor: William Gibson, Girton (GB)

(73) Assignee: Nokia Corporation, Espoo (FI)

( * ) Notice: Subject to any disclaimer, the term of this patent is extended or adjusted under 35 U.S.C. 154(b) by 1336 days.

(21) Appl. No.: 11/570,281

(22) PCT Filed: Jun. 8, 2005

(86) PCT No.: PCT/GB2005/002244
§ 371 (c)(1),
(2), (4) Date: May 17, 2007

(87) PCT Pub. No.: WO2005/121920
PCT Pub. Date: Dec. 22, 2005

(65) Prior Publication Data
US 2008/0022292 A1 Jan. 24, 2008

(30) Foreign Application Priority Data

Jun. 9, 2004 (GB) .................................. 0413059.7

(51) Int. Cl.
G06F 3/00 (2006.01)
G06F 9/44 (2006.01)
G06F 9/46 (2006.01)
G06F 13/00 (2006.01)
G06F 21/53 (2013.01)

(52) U.S. Cl.
CPC ...................................... G06F 21/53 (2013.01)
USPC .......................................... 719/313; 719/320

(58) Field of Classification Search
None
See application file for complete search history.

(56) References Cited

U.S. PATENT DOCUMENTS

| 4,104,721 | A | | 8/1978 | Markstein et al. | |
|---|---|---|---|---|---|
| 5,802,367 | A | * | 9/1998 | Held et al. | 719/332 |
| 5,903,728 | A | | 5/1999 | Semenzato | |
| 6,766,335 | B2 | * | 7/2004 | Kukura et al. | 717/108 |
| 6,907,531 | B1 | * | 6/2005 | Dodd et al. | 726/25 |
| 6,948,183 | B1 | * | 9/2005 | Peterka | 725/25 |
| 6,975,629 | B2 | * | 12/2005 | Welin | 370/392 |
| 7,028,300 | B2 | * | 4/2006 | Goldick | 718/104 |

(Continued)

FOREIGN PATENT DOCUMENTS

| EP | 0 326 700 | 8/1989 |
|---|---|---|
| GB | 2 318 435 | 4/1998 |

(Continued)

OTHER PUBLICATIONS

Devi, Passing a file handle to a funciton—newb Q—LINUX programming, May 6, 2002, www.programmersheaven.com.*

(Continued)

Primary Examiner — Craig Dorais
(74) Attorney, Agent, or Firm — Alston & Bird LLP

(57) ABSTRACT

A computing device is provided with a multiple process architecture for running plug-in code modules in their own dedicated processes for increasing both the security and reliability of software systems using plug-in design patterns. In this regard, the computing device may have a process-based security model that permits a software application to utilize a plug-in module having security attributes different to or incompatible with those of the application by invoking the plug-in module as a separate process. Additional and alternative apparatuses and methods are also provided.

4 Claims, 1 Drawing Sheet

(56) References Cited

U.S. PATENT DOCUMENTS

| | | | |
|---|---|---|---|
| 7,191,192 B2* | 3/2007 | Yellepeddy et al. | 1/1 |
| 7,320,075 B2* | 1/2008 | Sotoodeh et al. | 713/191 |
| 7,330,878 B2* | 2/2008 | Slavin et al. | 709/208 |
| 7,562,304 B2* | 7/2009 | Dixon et al. | 715/738 |
| 7,565,641 B2* | 7/2009 | Maxa et al. | 717/105 |
| 7,631,318 B2* | 12/2009 | Cottrille et al. | 719/328 |
| 2002/0002673 A1 | 1/2002 | Narin | |
| 2003/0177066 A1* | 9/2003 | Zhang et al. | 705/14 |
| 2004/0093525 A1* | 5/2004 | Larnen | 713/201 |
| 2005/0078822 A1* | 4/2005 | Shavit et al. | 380/201 |
| 2010/0138895 A1* | 6/2010 | Bouchat et al. | 726/1 |

FOREIGN PATENT DOCUMENTS

| | | |
|---|---|---|
| GB | 2 365 598 | 2/2002 |
| GB | 2 389 747 A | 12/2003 |
| GB | 2 391 655 A | 2/2004 |
| GB | 2 408 361 A | 5/2005 |
| JP | 2001-043080 A | 2/2001 |
| JP | 2003-518692 T | 6/2003 |
| JP | 2005-528051 T | 9/2005 |
| JP | 2007-523411 T | 8/2007 |
| WO | WO 01/48604 A1 | 7/2001 |
| WO | WO 03/100581 A2 | 12/2003 |
| WO | WO 2005/078552 A1 | 8/2005 |

OTHER PUBLICATIONS

Luke Tierney; "Rambling on plug-ins"; Feb. 1, 1997; XP002347196, retrieved from the internet: http://www.stat.umn.edu/users/stat-lisp-news/msg00381.html; retrieved on Aug. 31, 2005; the whole document.

Chen et al., "Setuid Demystified," Proc. of the 11th USENIX Security Symposium, San Francisco, CA (Aug. 5-9, 2002).

Office Action, dated Apr. 27, 2007, issued in corresponding GB Application No. GB 0413059.7.

Office Action, dated Jul. 23, 2008, issued in corresponding GB Application No. GB 0413059.7.

Office Action and translation, dated Oct. 2, 2007, issued in corresponding Chinese Application No. 200580019063.0.

Search Report, dated Oct. 14, 2004, issued in corresponding GB Application No. GB 0413059.7.

Office Action for Japanese Application No. 2007-526540 dated Feb. 15, 2011.

International Search Report and Written Opinion for Application No. PCT/GB2005/002244 dated Jan. 12, 2006.

Early Unix History and Evolution [online] [retrieved Feb. 17, 2011]. Retrieved from the Internet: <URL: http://cm.bell-labs.com/cm/cs/who/dmr/hist.html>. 13 pages.

Dmytro Taranovsky "Operating System Architecture", Jul. 29, 2002; XP-002342770, retrieved from the internet: http://web.mit.edu/dmytro/www/OS_Architecture.htm; 2 pages.

Sage; "Process Based Security"; Mar. 1, 2004; XP002342771; the whole document.

Luke Tierney; "Rambling on plug-ins"; Feb. 1, 1997; XP002347196, retrieved from the internet: http://www.stat.umn.edu/users/stat-lisp-news/msg00381.html; retrieved on Aug. 31, 2005; the whole document.

* cited by examiner

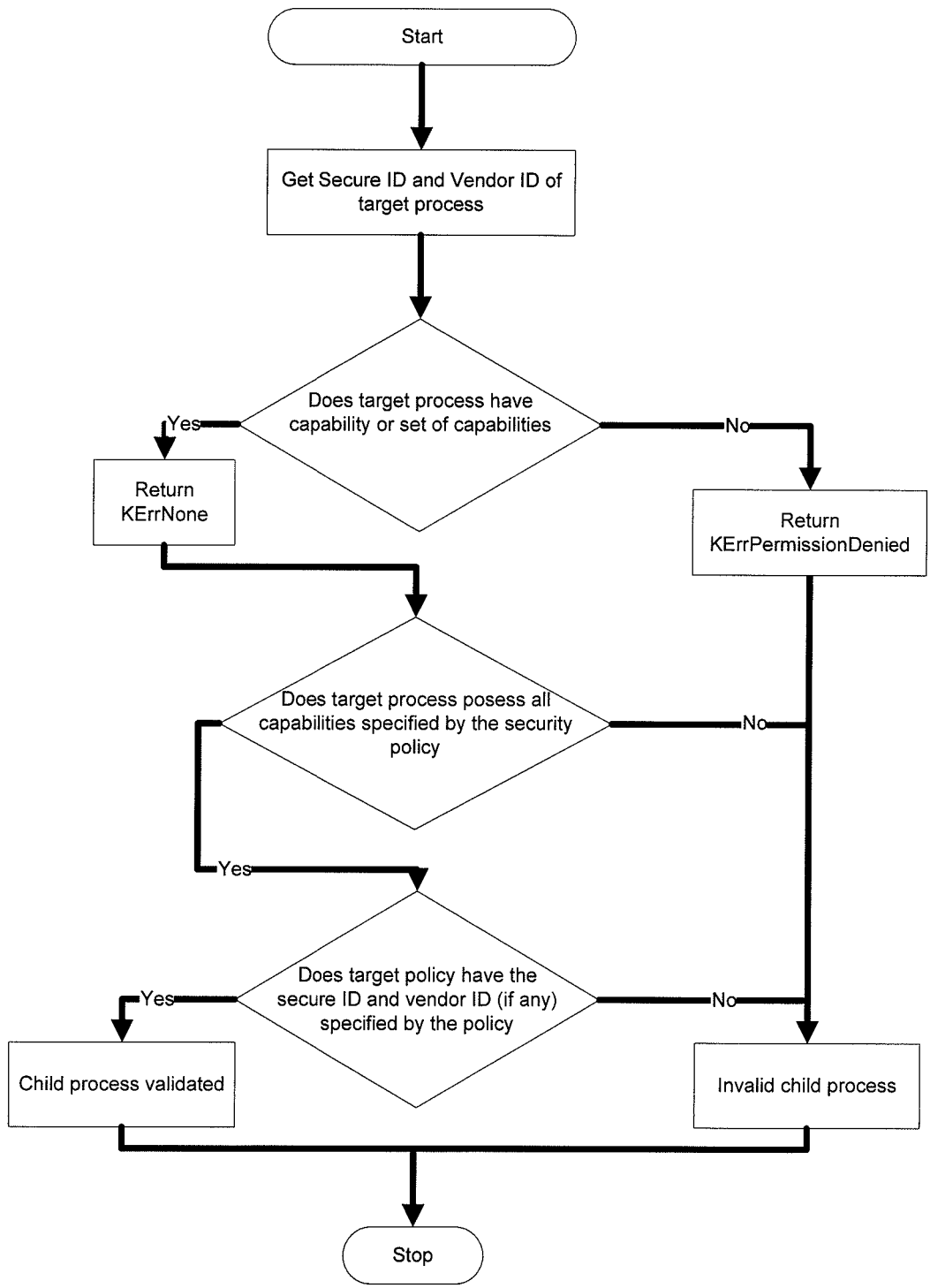

COMPUTING DEVICE HAVING A MULTIPLE PROCESS ARCHITECTURE FOR RUNNING PLUG-IN CODE MODULES

CROSS REFERENCE TO RELATED APPLICATIONS

This application claims the priority of PCT/GB2005/002244 filed on Jun. 8, 2005, and, GB 0413059.7 filed on Jun. 9, 2004, the entire contents of which are hereby incorporated in total by reference.

Various example embodiments of this invention relates to computing devices and methods for running plug-in code modules, and in particular to devices and methods for running such modules in their own dedicated processes for increasing both the security and reliability of software systems using plug-in design patterns.

DETAILED DESCRIPTION OF SOME EXAMPLE EMBODIMENTS

The term computing device as used herein is to be expansively construed to cover any form of electrical computing device and includes, data recording devices, computers of any type or form, including hand held and personal computers, and communication devices of any form factor, including mobile phones, smart phones, communicators which combine communications, image recording and/or playback, and computing functionality within a single device, and other forms of wireless and wired information devices.

A plug-in can be defined as a replaceable item of executable code that provides specific services to a loosely coupled application that can load or invoke the plug-in at run-time.

Plug-ins are widely used in many operating systems and by many applications. The main advantages of this technology are widespread and include:

- applications able to use plug-ins are inherently extensible, as plug-in modules can be added or replaced when new features are required;
- code for plug-ins is loaded by applications only on demand, enabling programs to make smaller demands on memory and be quicker to launch;
- plug-ins designs are architecturally flexible as the software designer does not need to know about the internal workings of any plug-in;
- they provide commercial benefits; the provision of optional or licensee provided functionality via plug-ins can improve time to market and also encourage a market for third parties to write plug-in modules for existing applications.

Plug-ins are often loaded as dynamic link libraries (DLLs) or similar type of modules which execute within the same process space as the application which invokes them. However, they can also be spawned (loaded and then run) as separate processes. These two alternative patterns are both in widespread use.

Dynamic link library (DLL) modules which are loaded by applications at run-time have been the traditional way for many applications to implement plug-ins. The software designer specifies in advance an architecture or framework which includes an abstract API to which all modules of a particular type must conform. Such modules 'plug-in' to the invoking application in a prescribed and predefined way, and are widely used in many operating systems. Users will probably have most familiarity with this type of plug-in in the form of modules such as printer drivers.

DLL plug-ins are regarded as being highly efficient; an application can directly call methods in a DLL with no significant speed or memory overhead compared to when those methods are integral to the application itself. They are also exceptionally flexible; plug-ins can be added to provide new functionality, or replaced to amend existing functionality. The invoking application generally includes code to identify all the plug-in DLLs of a particular type (or else specifies that its plug-ins must have specific unique file extension or directory location).

Spawned processes have been implemented in operating systems for many years. According to Dennis Ritchie, the ability to fork a process was something that Unix inherited from the mid-60s Berkeley SDS30 time-sharing system (see his paper "The Evolution of the Unix Time-Sharing System" at cm.bell-labs.com/cm/cs/who/dmr/hist.html). Although the use of this feature as a plug-in mechanism, enabling features to be added to applications, took rather long to become fully developed, it is now commonplace in various Unix based operating systems, and also in Microsoft Windows, most notably in the way that various executables plug into Internet Explorer to handle various types of content.

However, all plug-in module architectures are likely to give rise to concerns in the area of operating system or platform security. This covers the philosophy, architecture and implementation of platform defence mechanisms against malicious or badly written code. That plug-ins are considered to cause concerns in this area is hardly surprising because any increase in the openness, flexibility and upgradeability of a system is likely to raise such concerns.

Platform security is an issue for all computing and telecommunications devices. The integrity of the data on such devices, the potential for the devices to be used to spend a user's money, and the fact that they are used to store confidential and private information, makes this an area of increasing concern for manufacturers and consumers alike. Ensuring that plug-in mechanisms do not compromise security is therefore a paramount concern.

A focus on issues of trust and risk helps enormously in understanding why security problems reflect genuine concerns about plug-ins. Suppose an application which is able to access the bank account of a user is one that supports plug-ins. How can this application know that its plug-in modules can also be trusted with access to the bank account? And if the application is not sure that it can trust a particular plug-in module, how can it make use of its plug-in services without running the risk of exposing access to the bank account?

Conversely, suppose a device includes a plug-in module implementing encryption and decryption algorithms used to control access to protected content on the device. The plug-in module clearly needs to be able to trust that an application which tries to load it in order to access some data object really has the right to do so. Granting access to a non-trustworthy application places the integrity of the protected content at risk.

Many users of computing devices will be familiar with these types of issues and risks because they are very similar to the ones raised by viruses, trojans, worms and other types of computer malware that regularly infest the Internet.

While there are a number of schemes for securing operating systems and platforms in this area, the solutions to these problems as described in the context of the present invention are primarily concerned with process-based schemes, in which the process is the unit of security as well as the unit of memory protection. In such schemes, processes have various security attributes which may include but are not restricted to capabilities, permissions and identities. These terms are assumed to be readily understood by persons familiar with this art.

The most widely used operating systems of this type are derived from Unix, in which sets of permissions and group identities define what processes are able to do in the system and what resources they are able to open or access. However, by way of example only, the present invention is described in terms of the slightly different process-based platform security architecture introduced in the Symbian OS™ operating system for mobile communications devices from Symbian Software Ltd of London.

Many of the core components of this operating system have been described in UK Patent application 0312191.0 entitled "Secure Mobile Wireless Device", some portions of which are summarised here for convenience.

In the platform security architecture of the Symbian OS™ operating system, the public indicator of the degree of trust that can be placed in some item of executable code (whether an application or plug-in) is signified by the granting of one or more capabilities. In the case of executable processes, capabilities define their ability to open access to specific system resources. Such access should not be granted on the grounds of convenience; it should only be allowed when an audit demonstrates that there is not a high risk that a breach of trust will occur as a result of the access granted to the code.

As well as capabilities, there are other security attributes used in the Symbian OS™ operating system, including a set of unique identifiers (UID) for each file containing items of executable code, together with group IDs such as vendor ID (VID) which can be used to indicate the provenance of an item. Installable applications in the Symbian OS™ operating system may also carry security certificates conforming to public key infrastructure (PKI) specifications such as X.509.

An important feature of the Platform Security architecture provided by Symbian is that all types of executable code modules are assigned fixed capabilities when they are built. Two examples of these are outlined below.

In the case of applications, these capabilities determine the extent to which an application is trusted by the operating system with having access to system facilities (such as phone functionality) or data that is stored on the phone (such as contacts data). These capabilities are process-wide and never change In the case of DLLs, these capabilities determine the extent to which applications can trust the DLL's code, but when loaded, a DLL runs with the same capabilities as the process into which it has been loaded.

It is clear that this architecture renders plug-in DLL designs unsuitable in certain situations. This is because a DLL is loaded as part of the same process as the invoking application and has access to its entire address space and all its stored data. Because of this, an application has to have complete trust in the integrity of a plug-in DLL. The system loader for DLLs enforces the necessary trust by refusing to load any DLL which does not have capabilities at least as great as the application that wants to invoke it. For well-known and stable combinations of application and DLL this presents no problems. But, circumstances can be envisaged where difficulties will arise, and this is what can make plug-in DLLs an unsuitable design for a secure capability-based platform.

The most obvious example is where an application that has been upgraded with the addition of new capabilities will no longer be able to load the same DLLs that the earlier version was able to load successfully if those DLLs have not also been trusted with the new upgraded capability. Another example would be where a newly written application wanting to use the services provided by an existing DLL finds that it is unable to do so because the DLL cannot be trusted with the full set of its own capabilities.

The reverse of the above case can also occur. Because the capabilities of an application never change, a DLL which has been trusted with a sensitive capability that is essential for the functionality it seeks to provide could well find that certain applications are not able to take advantage of it because they have not been trusted with the equivalent level of capability by the operating system.

Such scenarios are not just theoretical; the whole point of plug-in architectures is to add flexibility and expandability to the system, and this almost certainly guarantees that problems of this nature will arise. As the number of DLLs and services that they request grows, so does the set of capabilities that they all must have.

An alternative to DLL plug-ins is spawned process plug-ins, which allows applications and their plug-ins to have disjoint capability sets. Unfortunately these present their own problems for secure platforms, precisely because the process plug-in pattern allows capability sets to be disjoint. There is no obvious mechanism in any current technology for spawning child processes which enables a mutual trust relationship to be established between parent and child processes, and the potential threats this deficiency poses are considered significant.

For example, how would a plug-in that is used to format a drive know that it could trust the behavior of an application that invoked it? And how would an application that wanted to use a plug-in to process secure data know that the plug-in could be trusted with the content of that data?

There are also practical problems that need to be solved when implementing a spawned process plug-in as a substitute for a DLL plug-in. These arise from the fact that the process is the fundamental unit of memory protection in the operating system; so neither the invoking application nor the plug-in process has automatic access to each other's address space, and neither one can directly call the other's application program interfaces (APIs).

This invention has as an object to provide a method whereby plug-ins can be implemented as processes, which can then be spawned by applications into a new address space, on the basis of mutual trust between the parent application and the child process.

According to a first aspect of the present invention there is provided a computing device having a process based security model and wherein a software application on the device is able to utilise a plug-in module having security attributes different to or incompatible with those of the application by invoking the plug-in module as a separate process.

According to a second aspect of the present invention there is provided a method of operating a computing device having a process based security model, the method comprising arranging for a software application on the device to be able to utilise a plug-in module having security attributes different to or incompatible with those of the application by invoking the plug-in module as a separate process.

According to a third aspect of the present invention there is provided an operating system for a computing device for causing a computing device according to the first aspect to operate in accordance with a method according to the second aspect.

BRIEF DESCRIPTION OF THE DRAWING

FIG. 1 is a flow diagram of a sample implementation of the method steps of the preferred embodiment of the invention.

An embodiment of the present invention will now be described by way of further example only.

This invention provides a computing device with a multiple process architecture and is predicated on the basis of creating mutual trust between a parent application and a child process.

Hence, a spawned process needs to ensure that it has not been invoked and passed information by an application that it does not itself trust. To facilitate this, a secure operating system in the computing device is arranged to provide facilities for child processes to retrieve all relevant identity, security and capability information about their parents. For instance, an application that reformatted the entire contents of the system disk would be able to ensure that any application that spawned it had the appropriate system capabilities (such as DiskAdmin in the Symbian OS™ operating system).

The secure operating system is also arranged to include facilities for parent applications to retrieve identity, security and capability information of child processes before they are spawned. This allows applications passing information to spawned processes to be sure that those processes can be trusted with that information.

Once an application is sure that it can trust its prospective executable plug-in, it passes information to the plug-in before the plug-in starts executing via a special temporary data structure that holds a number of untyped integers. Since these are untyped, they can be used to pass file sessions and handles to system resources or other objects (such as shared memory chunks, file handles, mutexes and semaphores). The structure used by the Symbian OS™ operating system is based on sixteen environment slots, each of which can be read only once. Reference is made to UK Patent application 0327261.4 entitled "Secure Handles", which teaches how handles to objects can be passed securely, and to UK Patent application 0312190.2 entitled "Secure Mobile Wireless Device With Protected File System", which teaches how the mechanisms for passing file handles enables sharing of secured files between applications and their plug-ins.

With the present invention, a very high degree of control is provided over what information an application exposes to a plug-in process. The choice of what information to pass is entirely up to the invoking application, and if it does not choose to pass a particular item, then there is no way that the plug-in can find out that the item even exists, let alone ascertain its contents. Therefore, it is virtually impossible for a rogue plug-in process to accidentally or deliberately corrupt or compromise the function of the parent application by unauthorised calling of its APIs or accesses to its data.

The converse is also true; a plug-in process does not automatically expose any of its own methods or data to the invoking application. This makes it possible to design plug-in processes which are granted highly sensitive capabilities, but which can nevertheless be used by applications that might not necessarily have access to them. The process is arranged to police the information passed to it quite carefully in order to avoid leaking capabilities when providing services to applications. However, as outlined above, this is not possible with plug-in DLLs.

By having the plug-in modules running as separate processes, it is possible to provide the plug-ins with only the capabilities that they really need. By doing this, a more secure system is achieved, and no special rules are needed to cover applications which spawn plug-in processes with less capabilities than the applications possess themselves.

Because plug-ins run in their own process space, a badly behaved plug-in will generally not damage its parent application; in contrast, DLL plug-ins that are badly behaved are liable to crash applications and corrupt data. The multiple process architecture provided by this invention therefore has the advantage of ensuring the stability and reliability of the operating system and all its subsystems. If a plug-in crashes it can be safely ignored in future.

It is possible to increase the capabilities of a process that invokes plug-ins without breaking binary compatibility. By not dictating the capabilities required for the plug-ins, continued development of the system as a whole carries less of a compatibility burden.

Hence, this invention is a means of increasing both the security and reliability of software systems using plug-in design patterns by implementing a plug-in in its own dedicated process. By doing so, applications are able to check the security attributes of plug-ins before invoking them or passing them information, and plug-ins are able to check the security attributes of the applications that invoked them before acting on information they receive.

This ensures that an application can make use of plug-ins whose security attributes are different to or incompatible with its own; and a plug-in that fails or is badly behaved will not cause failure of the operating system framework to which it interfaces.

The Symbian OS™ operating system methodologies which enable applications and plug-ins to establish mutual trust relationships based on discovery of capability and identity, and also the methods of passing data from parent to child processes will now be described.

The following code examples are sample implementations of the above techniques. It is assumed in these examples that the reader is familiar with the Symbian OS™ operating system programming idioms. Those skilled in the art will readily be able to adapt the techniques disclosed here to their own operating system environments. The following code examples are sample implementations of the above techniques. It is assumed in these examples that the reader is familiar with the Symbian OS™ operating system programming idioms. Those skilled in the art will readily be able to adapt the techniques disclosed here to their own operating system environments. FIG. 1 is a flow diagram of the steps of the following sample implementation.

a) How Parents can Check Capability and Identity Information of Child Processes.

```
TUint32 RProcess::SecureId( ) const;
TUint32 RProcess::VendorId( ) const;
```

These return the Secure ID and Vendor ID of the target process

```
TInt RProcess::HasCapability(TCapability aCap) const;
TInt RProcess::HasCapability(TCapability aCap1, TCapability aCap2)
const;
TInt RProcess::HasCapability(TCapability aCap1, TCapability aCap2,
TCapability aCap3) const;
```

These check whether the target process has a particular capability or set of capabilities, and return either KErrNone or KErrPermissionDenied.

```
TInt RProcess::CheckPolicy(const TSecurityPolicy& aPolicy) const;
```

Checks that the target process possesses all capabilities specified by aPolicy and also has the Secure ID or Vendor ID (if any) specified by aPolicy.

b) How Child Processes can Check Capability and Identity Information of Parents.

```
TUint32 User::CreatorSecureId( ) const;
TUint32 User::CreatorVendorId( ) const;
```

These return the Secure ID and Vendor ID of the process which created the current process.

```
TInt User::CreatorHasCapability(TCapability aCap) const;
TInt User::CreatorHasCapability(TCapability aCap1, TCapability aCap2) const;
TInt User::CreatorHasCapability(TCapability aCap1, TCapability aCap2, TCapability aCap3) const;
```

These check whether the process which created the current process has a particular capability or set of capabilities, and return either KErrNone or KErrPermissionDenied.

```
TInt User::CreatorCheckPolicy(const TSecurityPolicy& aPolicy) const;
```

Checks that the process which created the current process possesses all capabilities specified by aPolicy and also has the Secure ID or Vendor ID (if any) specified by aPolicy.

c) Passing Data to Child Processes

In the Symbian OS™ operating system a process has 16 environment slots that can contain information passed to it by a launching process. For the purpose of this document, the launching process is called the parent and the launched process is called the child. Slot 0 is reserved and is not available for general purpose information passing.

The parent process preferably passes information to the child process after creating the child process, but before resuming it. It is an error to try and set environment data in a process which has been resumed.

It should be noted that the child process can only extract the information from its environment once only.

The parent and child process authors should both agree what is in the environment slots, there is not a way of querying the contents of a slot apart from its length.

The parent process calls SetParameter to put parameters in the child processes environment.

```
TInt RProcess::SetParameter(TInt aSlot, RHandleBase aHandle);
TInt RProcess::SetParameter(TInt aSlot, const RSubSessionBase& aSession);
TInt RProcess::SetParameter(TInt aSlot, const TDesC16& aDes);
TInt RProcess::SetParameter(TInt aSlot, const TDesC8& aDes);
TInt RProcess::SetParameter(TInt aSlot, TInt aData);
```

The child process extracts the information from its environment, either using RHandleBase::Open or the User APIs

```
TInt RSemaphore ::Open(TInt aArgumentIndex, TOwnerType aType=EOwnerProcess);
TInt RBusLogicalChannel::Open(TInt aArgumentIndex, TOwnerType aType=EOwnerProcess);
TInt RMsgQueueBase::Open(TInt aArgumentIndex, TOwnerType aType=EOwnerProcess);
TInt RMutex::Open(TInt aArgumentIndex, TOwnerType aType=EOwnerProcess);
TInt RChunk::Open(TInt aArgumentIndex, TOwnerType aType=EOwnerProcess);
TInt RSessionBase::Open(TInt aArgumentIndex, TOwnerType aType=EOwnerProcess);
IMPORT_C static TInt User::ParameterLength(TInt aSlot);
IMPORT_C static TInt User::GetTIntParameter(TInt aSlot, TInt& aData);
IMPORT_C static TInt User::GetDesParameter(TInt aSlot, TDes8& aDes);
IMPORT_C static TInt User::GetDesParameter(TInt aSlot, TDes16& aDes);
``` d) Passing a File Handle

File server session handles and file handles can be passed to a child process. To use a file handle, the session handle is also obtained. The child process adopts the file handle so it must not be closed by the parent. It is preferable for security reasons that a file server session is created specifically for sharing the file and is not used for anything else by the parent process.

```
//Launching process
    RProcess p;
    p.Create(KProcName, KNullDesC);      //create "child" process
    RFile file;
    RFs session;
    session.Connect( );                   //connect to file server
    session.ShareProtected( );
    file.Create(iSession, KFileName,
EFileStreamText|EFileWrite|EFileShareAny);
    file.Write(0, KTestData);
    p.SetParameter(5, session);           //session handle
    p.SetParameter(6, file);              //file handle
    session.Close( );
    p.Resume( );
//Launched process
    RFs session;
    session.Open(5);                      //obtain session handle
    RFile file;
    TInt handle;
    ret = User::GetTIntParameter(6, handle);  //get file handle
    file.Adopt(session, handle);          //adopt the handle
    TBuf8<100> rbuf;                      //use the file
    ret = file.Read(0, rbuf);
    file.Close( );
    session.Close( );
``` e) Passing a Handle Derived from RHandleBase

Handles derived from RHandleBase can be passed to a child process. The handle is duplicated when it is stored in the child's environment. The parent can close the handle immediately after calling SetParameter, or continue to use the handle and close it later.

```
//Launching process, passes a handle to a mutex and a semaphore
RMutex mutex;
RSemaphore sem;
RProcess p;
p.Create(KProcName, KNullDesC);
```

```
mutex.CreateGlobal(KMutexName);    //create the mutex
sem.CreateGlobal(KSemName, 0);     //create the semaphore
p.SetParameter(3, mutex);          //put mutex handle into child processes environment slot 3
p.SetParameter(4, sem);            //put semaphore handle into child processes environment slot 4
mutex.Close( );
Sem.Close( );
p.Resume( );                       //resume the child process
//Launched process retrieving the handles
RMutex mutex;
mutex.Open(3, EOwnerThread);       //get mutex handle
RSemaphore sem;
sem.Open(4, EOwnerThread);         //get semaphore handle
//use the semaphore and mutex
mutex.Close( );
sem.Close( );
``` f) Passing Descriptor Data

Eight and sixteen bit descriptor data can be passed from a parent to a child process. The data is copied into a buffer of the child process by calling User::GetDesParameter( ). The parameter length can be checked before retrieving it by calling User::ParameterLength( ).

```
//Launching process passing 8 and sixteen bit data
ret = p.Create(KProcName, KNullDesC);
p.SetParameter(2, KSixteenBitDes);
p.SetParameter(3, KEightBitDes);
p.Resume( );
//Launched process retrieving 8 and sixteen bit data
TBuf16<40> buf;
len = User::ParameterLength(2);    //parameter length is size in bytes
ret = User::GetDesParameter(2, buf);
test(buf.Length( ) == len/2);
TBuf8<40> buf8;
len = User::ParameterLength(3);
ret = User::GetDesParameter(3, buf8);
test (len == buf.Length( ));
``` g) Passing an Integer

An integer can be passed from a parent to a child process.

```
//Parent process
ret = p.Create(KProcName, KNullDesC);
p.SetParameter(12, 1234);
p.Resume( );
//Child process
TInt val;
ret = User::GetTIntParameter(12, val);
``` h) Error Handling

The parent process will be panicked when calling SetParameter with a Handle if
  It is not the creator process
  The slot number is out of range
  The slot is in use
  The handle is local The parent process will be panicked when calling SetParameter with a descriptor or integer if
  It is not the creator process
  The slot number is out of range
  The slot is in use
  The data length is negative.

The child process will be panicked if
  The slot number is out of range.

The API calls that extract data from the process environment will return KErrArgument if the slot contains the incorrect data type or the length is incorrect. They will return KErrNotFound if the slot is empty.

i) Implementation Considerations

When sharing a file handle, the parent process should create a separate file server session specifically for the purpose of sharing the file handle. This is because if the parent process has other files open at the same time as this file server session, the child process can gain access to those files by iterating through all the possible values for the file handle and attempting to adopt each one. The child process should only use this session for sharing the file and not for any other file access for the same reason.

SetParameter can only be called before the process is resumed.

The parameter information can only be retrieved once.

There are 16 data slots that can contain a handle, or binary data. Slot 0 is reserved.

Although the present invention has been described with reference to particular embodiments, it will be appreciated that modifications may be effected whilst remaining within the scope of the present invention as defined by the appended claims. For example, the invention is applicable to any process-based security architecture, including those utilising Unix style permissions.

The invention claimed is:

1. An apparatus comprising a computing device, the computing device being configured to cause the apparatus to at least:
  implement a process-based security model on the apparatus, wherein the process-based security model includes at least one set of permissions that defines allowable activities and accessible resources for a process;
  implement a software application having security attributes, wherein the software application is invoked as a first process and wherein the first process is a separately executing process;
  implement a plug-in module having security attributes different to, or incompatible with, the security attributes of the application;
  invoke the plug-in module as a second process, the second process being a separate process from the first process of the software application, wherein the second process is a separately executing process;
  wherein the software application seeking to invoke the plug-in module verifies the security attributes of the plug-in module before invoking the plug-in module and wherein the plug-in module verifies the security attributes of the application invoking the plug-in module; and
  pass information from the software application to the plug-in module via a data structure before the plug-in is executed, wherein the information is used as handles to system resources or other objects.

2. A method comprising:

implementing a process-based security model on a computing device, wherein the process-based security model includes at least one set of permissions that defines allowable activities and accessible resources for a process;

implementing a software application having security attributes, wherein the software application is invoked as a first process and wherein the first process is a separately executing process;

implementing a plug-in module having security attributes different to, or incompatible with, the security attributes of the software application;

invoking the plug-in module as a second process, the second process being a separate process from the first process of the application, wherein the second process is a separately executing process;

wherein the software application seeking to invoke the plug-in module verifies the security attributes of the plug-in module before invoking the plug-in module and wherein the plug-in module verifies the security attributes of the software application invoking the plug-in module; and passing information from the software application to the plug-in module via a data structure before the plug-in is executed, wherein the information is used as handles to system resources or other objects.

3. An apparatus comprising a computing device, the computing device being configured to cause the apparatus to at least:

implement an operating system having a process-based security model, wherein the process-based security model includes at least one set of permissions that defines allowable activities and accessible resources for a process;

implement a software application having security attributes, wherein the software application is invoked as a first process and wherein the first process is a separately executing process;

implement a plug-in module having security attributes different to, or incompatible with, the security attributes of the software application;

invoke the plug-in module as a second process, the second process being a separate process from the first process of the application, wherein the second process is a separately executing process;

wherein the software application seeking to invoke the plug-in module verifies the security attributes of the plug-in module before invoking the plug-in module and wherein the plug-in module verifies the security attributes of the application invoking the plug-in module; and pass information from the software application to the plug-in module via a data structure before the plug-in is executed, wherein the information is used as handles to system resources or other objects.

4. The apparatus of claim 3, wherein the computing device configured to implement the operating system includes being configured to implement the operating system having a process-based security model, the process-based security model being configured to use a process for implementing security features and memory protection.

\* \* \* \* \*